United States Patent
Patne et al.

(10) Patent No.: US 9,774,614 B2
(45) Date of Patent: Sep. 26, 2017

(54) METHODS AND SYSTEMS FOR SIDE CHANNEL ANALYSIS DETECTION AND PROTECTION

(71) Applicant: QUALCOMM Incorporated, San Diego, CA (US)

(72) Inventors: Satyajit Prabhakar Patne, San Diego, CA (US); Rajarshi Gupta, Sunnyvale, CA (US); Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/312,957

(22) Filed: Jun. 24, 2014

(65) Prior Publication Data
US 2015/0373036 A1    Dec. 24, 2015

(51) Int. Cl.
*G06F 21/55* (2013.01)
*H04L 29/06* (2006.01)

(52) U.S. Cl.
CPC ........ *H04L 63/1416* (2013.01); *G06F 21/558* (2013.01); *H04L 63/1466* (2013.01)

(58) Field of Classification Search
CPC ............. H04L 63/1416; H04L 63/1466; G06F 21/554; G06F 21/556; G06F 21/558
USPC .......................................................... 726/23
See application file for complete search history.

(56) References Cited

U.S. PATENT DOCUMENTS

| | | | |
|---|---|---|---|
| 7,787,620 B2 | 8/2010 | Kocher et al. | |
| 8,341,758 B2 | 12/2012 | Kim et al. | |
| 8,588,764 B1 * | 11/2013 | Koller | H04W 8/18 455/405 |
| 8,655,307 B1 * | 2/2014 | Walker | H04W 52/0212 455/343.5 |

(Continued)

FOREIGN PATENT DOCUMENTS

| | | |
|---|---|---|
| JP | 2010015476 A | 1/2010 |
| JP | 2013072950 A | 4/2013 |
| JP | 2013143653 A | 7/2013 |

OTHER PUBLICATIONS

Haas J.D., "Side Channel Analysis and Embedded Systems Impact and Countermeasures," Black Hat Europe, 2008, Slide 1 to slide 42.

(Continued)

*Primary Examiner* — Minh Dinh
(74) *Attorney, Agent, or Firm* — The Marbury Law Group, PLLC

(57) ABSTRACT

A computing device may use machine learning techniques to determine whether a side channel attack is underway and perform obfuscation operations (e.g., operations to raise the noise floor) or other similar operations to stop or prevent a detected side channel attack. The computing device may determine that a side channel attack is underway in response to determining that the computing device is in airplane mode, that the battery of the computing device the battery has been replaced with a stable DC power supply, that the touch-screen display of the computing device has been disconnected, that there are continuous calls to a cipher application programming interface (API) using the same cipher key, that there has been tampering with a behavioral analysis engine of the computing device, or any combination thereof.

28 Claims, 8 Drawing Sheets

(56) References Cited

U.S. PATENT DOCUMENTS

| | | | |
|---|---|---|---|
| 8,892,903 | B1 | 11/2014 | Trimberger |
| 2003/0009683 | A1 | 1/2003 | Schwenck et al. |
| 2008/0091975 | A1 | 4/2008 | Kladko et al. |
| 2011/0029828 | A1 | 2/2011 | Bancel et al. |
| 2011/0202948 | A1 | 8/2011 | Bildgen et al. |
| 2012/0124669 | A1 | 5/2012 | Carpenter et al. |
| 2013/0318607 | A1* | 11/2013 | Reed .................. G06F 11/3062 726/23 |
| 2014/0020097 | A1 | 1/2014 | Riou |
| 2014/0059688 | A1 | 2/2014 | Margalit |
| 2014/0115405 | A1 | 4/2014 | Condorelli et al. |
| 2015/0089657 | A1 | 3/2015 | Cohn et al. |
| 2015/0161379 | A1 | 6/2015 | Korman et al. |
| 2015/0365427 | A1* | 12/2015 | Ben-Shalom ........... G06F 21/56 726/23 |
| 2015/0373035 | A1 | 12/2015 | Patne et al. |

OTHER PUBLICATIONS

Lerman L., et al., "Semi-Supervised Template Attack," Constructive Side-Channel Analysis and Secure Design, Lecture Notes in Computer Science, 2013, vol. 7864, pp. 184-199.

Lerman L., et al., "Side channel attack, an approach based on machine learning," COSADE 2011—Second International Workshop on Constructive Side-Channel Analysis and Secure Design, 2011, pp. 29-41.

Pongaliur K., et al., "Securing Sensor Nodes Against Side Channel Attacks," 11th IEEE High Assurance Systems Engineering Symposium, 2008, pp. 353-361.

Rohatgi P., "Electromagnetic Attacks and Countermeasures," Cryptographic Engineering. 2009, pp. 407-430.

* cited by examiner

US 9,774,614 B2

METHODS AND SYSTEMS FOR SIDE CHANNEL ANALYSIS DETECTION AND PROTECTION

RELATED APPLICATIONS

This application is related to U.S. patent application Ser. No. 14/312,939 entitled "Methods and Systems for Thwarting Side Channel Attacks" which is filed concurrently herewith.

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, mobile devices are quickly becoming the next frontier for side channel attacks, which are being increasingly used by thieves and hackers to steal confidential information from computing devices. Accordingly, new and improved security solutions that better protect resource constrained computing devices, such as mobile and wireless devices, will be beneficial to consumers.

SUMMARY

The various aspects include methods of using behavioral analysis or machine learning techniques in a computing device to determine whether a side channel attack is underway, and respond to ongoing side channel attacks. In an aspect, the methods may include monitoring an activity of the computing device, generating a behavior vector based on the monitored activity, and applying the generated behavior vector to a classifier model so as to determine whether a side channel attack is underway based on factors that include whether the computing device is in airplane mode, whether a battery of the computing device the battery has been replaced with a stable DC power supply, whether a touch-screen display of the computing device has been disconnected, whether there are continuous calls to a cipher application programming interface (API), and/or whether there has been tampering with a behavioral analysis engine of the computing device.

In an aspect, the methods may include performing an obfuscation operation in response to determining that the monitored activity is associated with the side channel attack. In an aspect, the methods may include terminating the monitored activity in response to determining that the monitored activity is associated with the side channel attack. In an aspect, monitoring the activity of the computing device may include determining a feature that is to be observed in the computing device in order to identify the side channel attack, and monitoring the determined feature by collecting behavior information from a hardware component associated with that feature. In an aspect, collecting behavior information from the hardware component associated with the feature may include collecting information from a log of API calls that stores API call information for the access and use of the hardware component by software applications of the computing device.

In an aspect, applying the generated behavior vector to the classifier model to determine whether the side channel attack is underway may include applying machine learning techniques to generate a first family of classifier models that describe a cloud corpus of behavior vectors, determining which factors in the first family of classifier models have a high probability of enabling the computing device to conclusively determine whether a behavior is indicative of a side channel attack, generating a second family of classifier models that identify fewer factors and data points as being relevant for enabling the computing device to determine whether the behavior is indicative of a side channel attack, and generating the classifier model based on the second family of classifier models.

Further aspects may include a computing device that includes means for monitoring an activity of the computing device, means for generating a behavior vector based on the monitored activity, and means for applying the generated behavior vector to a classifier model to determine whether a side channel attack is underway based on whether the computing device is in airplane mode, whether a battery of the computing device the battery has been replaced with a stable DC power supply, whether a touch-screen display of the computing device has been disconnected, whether there are continuous calls to a cipher API, and/or whether there has been tampering with a behavioral analysis engine of the computing device.

In an aspect, the computing device may include means for performing an obfuscation operation in response to determining that the monitored activity is associated with the side channel attack. In an aspect, the computing device may include means for terminating the monitored activity in response to determining that the monitored activity is associated with the side channel attack. In an aspect, monitoring the activity of the computing device may include means for determining a feature that is to be observed in the computing device in order to identify the side channel attack, and means for monitoring the determined feature by collecting behavior information from a hardware component associated with the determined feature. In an aspect, means for collecting behavior information from the hardware component associated with the feature may include means for collecting information from a log of application programming interface (API) calls that stores API call information for use of the hardware component by software applications of the computing device.

In an aspect, means for applying the generated behavior vector to the classifier model to determine whether the side channel attack is underway may include means for applying machine learning techniques to generate a first family of classifier models that describe a cloud corpus of behavior vectors, means for determining which factors in the first family of classifier models have a high probability of enabling the computing device to conclusively determine whether a behavior is indicative of a side channel attack, means for generating a second family of classifier models that identify fewer factors and data points as being relevant for enabling the computing device to determine whether the behavior is indicative of a side channel attack, and means for generating the classifier model based on the second family of classifier models.

Further aspects may include a computing device having a processor configured with processor-executable instructions to perform operations that include monitoring an activity of the computing device, generating a behavior vector based on the monitored activity, and applying the generated behavior vector to a classifier model to determine whether a side channel attack is underway based on whether the computing device is in airplane mode, whether a battery of the computing device the battery has been replaced with a stable DC power supply, whether a touch-screen display of the computing device has been disconnected, whether there are continuous calls to a cipher API, and/or whether there has been tampering with a behavioral analysis engine of the computing device.

In an aspect, the processor may be configured with processor-executable instructions to perform operations that include performing an obfuscation operation in response to determining that the monitored activity is associated with the side channel attack. In an aspect, the processor may be configured with processor-executable instructions to perform operations that include terminating the monitored activity in response to determining that the monitored activity is associated with the side channel attack.

In an aspect, the processor may be configured with processor-executable instructions to perform operations such that monitoring the activity of the computing device includes determining a feature that is to be observed in the computing device in order to identify the side channel attack, and monitoring the determined feature by collecting behavior information from a hardware component associated with the determined feature. In an aspect, the processor may be configured with processor-executable instructions to perform operations such that collecting the behavior information from the hardware component associated with the feature includes collecting information from a log of application programming interface (API) calls that stores API call information for use of the hardware component by software applications of the computing device.

In an aspect, the processor may be configured with processor-executable instructions to perform operations such that applying the generated behavior vector to the classifier model to determine whether the side channel attack is underway further includes applying machine learning techniques to generate a first family of classifier models that describe a cloud corpus of behavior vectors, determining which factors in the first family of classifier models have a high probability of enabling the computing device to conclusively determine whether a behavior is indicative of a side channel attack, generating a second family of classifier models that identify fewer factors and data points as being relevant for enabling the computing device to determine whether the behavior is indicative of a side channel attack, and generating the classifier model based on the second family of classifier models.

Further aspects include a non-transitory computer readable storage medium having stored thereon processor-executable software instructions configured to cause a processor of a computing device to perform operations for detecting side channel attacks in which the operations may include monitoring an activity of the computing device, generating a behavior vector based on the monitored activity, and applying the generated behavior vector to a classifier model to determine whether a side channel attack is underway based on whether the computing device is in airplane mode, whether a battery of the computing device the battery has been replaced with a stable DC power supply, whether a touch-screen display of the computing device has been disconnected, whether there are continuous calls to a cipher API, and/or whether there has been tampering with a behavioral analysis engine of the computing device.

In an aspect, the stored processor-executable software instructions may be configured to cause a processor to perform operations that include performing an obfuscation operation in response to determining that the monitored activity is associated with the side channel attack. In an aspect, the stored processor-executable software instructions may be configured to cause a processor to perform operations that include terminating the monitored activity in response to determining that the monitored activity is associated with the side channel attack.

In an aspect, the stored processor-executable software instructions may be configured to cause a processor to perform operations such that monitoring the activity of the computing device includes determining a feature that is to be observed in the computing device in order to identify the side channel attack, and monitoring the determined feature by collecting behavior information from a hardware component associated with the determined feature. In an aspect, the stored processor-executable software instructions may be configured to cause a processor to perform operations such that collecting the behavior information from the hardware component associated with the feature includes collecting information from a log of application programming interface (API) calls that stores API call information for use of the hardware component by software applications of the computing device.

In an aspect, the stored processor-executable software instructions may be configured to cause a processor to perform operations such that applying the generated behavior vector to the classifier model to determine whether the side channel attack is underway further includes applying machine learning techniques to generate a first family of classifier models that describe a cloud corpus of behavior vectors, determining which factors in the first family of classifier models have a high probability of enabling the computing device to conclusively determine whether a behavior is indicative of a side channel attack, generating a second family of classifier models that identify fewer factors and data points as being relevant for enabling the computing device to determine whether the behavior is indicative of a side channel attack, and generating the classifier model based on the second family of classifier models.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
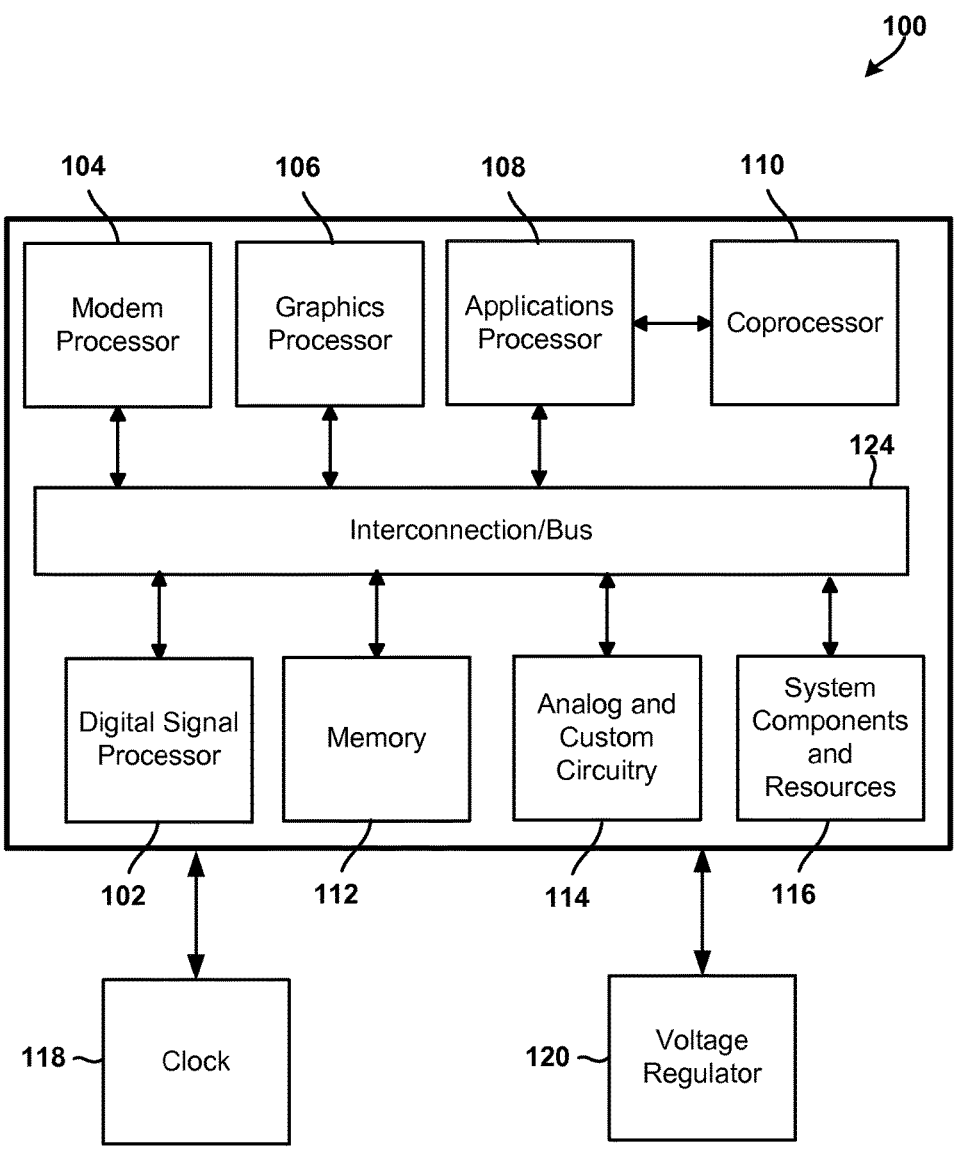
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include computing devices configured to use behavioral analysis and machine learning techniques to monitor the access and use of various hardware components and features of the computing device, and intelligently determine whether a side channel attack is underway. The computing device may then take appropriate measure to respond to attacks, such as by performing obfuscation operations to raise the noise floor of the computing device.

By using behavioral analysis and machine learning techniques to determine whether a side channel attack is underway, the various aspects enable a computing device to detect and respond to side channel attacks without causing a significant negative or user-perceivable change in the responsiveness, usability, performance, or power consumption characteristics of the computing device. As such, the various aspects are especially well suited for use in consumer electronics and resource constrained computing systems, such as mobile communication devices (e.g., smartphones), that have limited processing and battery resources and for which a pleasant user experience is important.

The word "exemplary" is used herein to mean "serving as an example, instance, or illustration." Any implementation described herein as "exemplary" is not necessarily to be construed as preferred or advantageous over other implementations.

The term "performance degradation" is used herein to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign."

The terms "wireless device," "mobile device" and "user equipment" are used generically and interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar electronic devices which include a memory, a programmable processor for which performance is important, and operate under battery power such that power conservation methods are of benefit. While the various aspects are particularly useful for mobile devices, which are resource constrained systems, the aspects are generally useful in any computing device that includes a processor and executes software applications.

Generally, a side channel attack is a cyber-attack based on information gained from the observable signal emissions (e.g., sounds, magnetic fields, heat, etc.) of the computing device. As an example of a side channel attack, a first computing device (attacker device) that includes a microphone, heat sensor, or magnetometer may be placed in close proximity (e.g., a few feet) to a second computing device (attacked device). The attacker device may then send a series of encrypted e-mails to the attacked device, and monitor/record changes in the observable signal emissions (e.g., sounds, magnetic fields, heat, etc.) of the attacked device as it receives and decrypts the emails. The attacker device may analyze these changes to determine the precise operations performed by the attacked device for decrypting the emails, and use this information to ascertain the cryptographic keys used by the attacked device when decrypting the emails. The attacker device could then intercept communications to and from the attacked device, and use the improperly obtained cryptographic keys to decrypt the intercepted communications.

The various aspects include computing devices configured to use behavioral analysis and machine learning techniques to learn the conditions and behaviors that are typically associated with side channel attacks, and use this information along with other behavior information collected from the device to intelligently determine whether a side channel attack is underway.

For example, modern mobile computing devices commonly include a highly integrated system on chip (SOC) that shares a clock tree with many of the device's other systems and subsystems. This often causes the computing device to emit noise signals that complicate side channel analysis and/or prevent an attacker device from identifying and measuring the expected signals such as power traces, sounds, and fields that generated by specific activities in the device over time. Therefore, many side channel attacks favor the attacked device entering an "airplane" or other operating mode that reduces these noise emissions before performing the side channel attack by monitoring the changes in the observable signal emissions. In view of this, the computing device may be equipped with a comprehensive behavioral monitoring and analysis system configured to monitor the operating state of the device to determine whether the device has been placed in an "airplane" mode or any other operating mode that reduces wireless communications, electromagnetic leakage, etc., and use this information along with other detected device behaviors/operations to determine whether a side channel attack is underway.

The behavioral monitoring and analysis system may also be configured to monitor the power supply state of the computing device to determine whether a DC power supply is connected to battery pins. Sophisticated side channel attacks may require the collection of large volumes of power trace data from the attacked device for an extended period of time (e.g., over a period of hours or days). Since a typical lithium-ion battery of a smartphone cannot support such operations, attackers commonly replace the battery of the attacked device with a stable DC power supply before launching the attack. That is, the attackers physically remove the battery and connect a stable DC power supply to the battery pins. In view of this, the behavioral monitoring and analysis system may be configured to detect this condition (i.e., replacement of a battery with a stable DC power supply), and use this information along with other detected device behaviors/operations to determine whether a side channel attack is underway.

In an aspect, the behavioral monitoring and analysis system may be configured to monitor the status of an electronic display of the computing device to determine whether the display has been disconnected, disabled, or powered off, and use this information to determine whether a side channel attack is underway. The status of the electronic display is useful for determining whether a side channel attack is underway because attackers commonly disconnect the electronic display of the computing device to reduce interference and noise before launching a side channel attack. Since most normal device usage patterns do not require disconnecting the electronic display, the behavioral monitoring and analysis system may use the existence of such condition as being indicative of a suspicious activity that requires further analysis.

In an aspect, the behavioral monitoring and analysis system may be configured to monitor communications to identify repeated, extended, or continuous calls to a cipher API that uses the same cipher key, and use this information to determine whether a side channel attack is underway. Normal device communications seldom lasts more than several hours or repeatedly use the same cipher key. In view of this, the behavioral monitoring and analysis system may monitor extended communications (e.g., call, data, or streaming sessions, etc.) and/or the repeated use of the same cipher key to determine whether a side channel attack is underway.

In an aspect, the behavioral monitoring and analysis system may be configured to intelligently determine whether it has been improperly disabled or stopped, and use this information to determine whether a side channel attack is underway. For example, the behavioral monitoring and analysis system may be configured to analyze select operations and behaviors of the computing device after it is instructed to power down, terminate, or stop so as to determine whether a side channel attack is underway.

In the various aspects, the behavioral monitoring and analysis system may include an observer process, daemon, module, or sub-system (herein collectively referred to as a "module") configured to instrument or coordinate various application programming interfaces, registers, counters or other components (herein collectively "instrumented components") at various levels of the computing device system. The observer module may continuously (or near continuously) monitor activities of the computing device by collecting behavior information from the instrumented components. The behavioral monitoring and analysis system may also include an analyzer module, and the observer module may communicate (e.g., via a memory write operation, function call, etc.) the collected behavior information to the analyzer module. The analyzer module may be configured to perform real-time behavior analysis operations, which may include performing, executing, and/or applying data, algorithms, classifiers or models (herein collectively referred to as "classifier models") to the collected behavior information to determine whether a side channel attack is underway.

In some aspects, the behavioral monitoring and analysis system may be configured to intelligently and efficiently identify, prevent, and/or correct the conditions, factors, and/or device behaviors that contribute to the computing device's degradation in performance and/or power utilization levels over time. In these aspects, the analyzer module may be further configured to perform real-time behavior analysis operations to determine whether an activity or device behavior is not benign (e.g., malicious, poorly written, performance-degrading, etc.).

Some aspects may include network servers and computing devices configured to work in conjunction with one another to efficiently identify, classify, model, prevent, and/or correct the conditions and/or device behaviors that may degrade the performance and/or power utilization levels of computing devices over time. As part of these operations, the network servers and computing devices may work in conjunction with one another to determine whether a side channel attack is underway.

In an aspect, the network server may be configured to receive information on various conditions, features, behaviors and corrective actions from a central database (e.g., the "cloud"), and use this information to generate a full classifier model (i.e., a data or behavior model) that describes a large corpus of behavior information in a format or structure (e.g., finite state machine, etc.) that can be quickly converted into one or more lean classifier models by the computing device. The network server may be configured to generate the full classifier model to include information that may be used by the computing device to determine whether a condition or behavior is associated with a side channel attack.

In an aspect, the full classifier model may be a finite state machine description or representation of the large corpus of behavior information. In an aspect, the finite state machine may include information that is suitable for expression as a plurality of nodes, boosted decision trees, or decision stumps that each test one or more features. For example, the finite state machine may be an information structure that may be expressed as a family of boosted decision stumps that collectively identify, describe, test, or evaluate all or many of the features and data points that are relevant to determining whether side channel attack is underway and/or whether a device behavior is not benign. The network server may then send the full classifier model (i.e., information structure that includes the finite state machine and/or family of boosted decision stumps, etc.) to the computing device.

The computing device may receive and use the full classifier model to generate device-specific lean classifier models or a family of lean classifier models of varying levels of complexity (or "leanness"). To accomplish this, the computing device may prune or cull the robust family of boosted decision trees included in the full classifier model received from the network server to generate a lean classifier model that includes a reduced number of boosted decision nodes and/or evaluates a limited number of test conditions or features that are specific to the computing device, to a software application of the computing device, and/or to type or category of software application. The computing device may then use these locally generated classifier models to perform the real-time behavior monitoring and analysis operations to determine whether an activity or behavior is part of a side channel attack and/or whether activity or behavior is otherwise not benign.

By generating full classifier models that describe or express a large corpus of information as a finite state machine, decision nodes, decision trees, or other similar information structures that can be modified, culled, augmented, or otherwise used to generate lean classifier models, the various aspects allow the computing device to generate lean classifier models quickly, efficiently and without accessing training data or further communicating with the network server, the central database, or the cloud network/server. This significantly reduces the computing device's dependence on the network, and improves the performance and power consumption characteristics of the device.

Further, by generating the lean classifier models locally in the computing device to account for application or device-specific features, the various aspects allow the computing device to focus its operations on the features or factors that are most important for determining whether a. This allows the computing device to both protect against side channel attacks and respond to undesirable behaviors without causing a significant negative or user-perceivable change in the responsiveness, performance, or power consumption characteristics of the computing device.

The various aspects may be implemented in a number of different computing devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108.

Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8). Further, each processor 102, 104, 106, 108, 110 may be configured to perform various obfuscation operations, including auxiliary operations that raise the noise floor of the SOC 100.

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The resources/system components 116 and custom circuitry 114 may include circuitry to interface with peripheral devices, such as cameras, electronic displays, wireless communication devices, external memory chips, etc. The processors 102, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, application processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, global positioning system (GPS) receivers, communications circuitry (e.g., Bluetooth®, WLAN, WiFi, etc.), and other well known components (e.g., accelerometer, etc.) of modern electronic devices.

Figure 2:
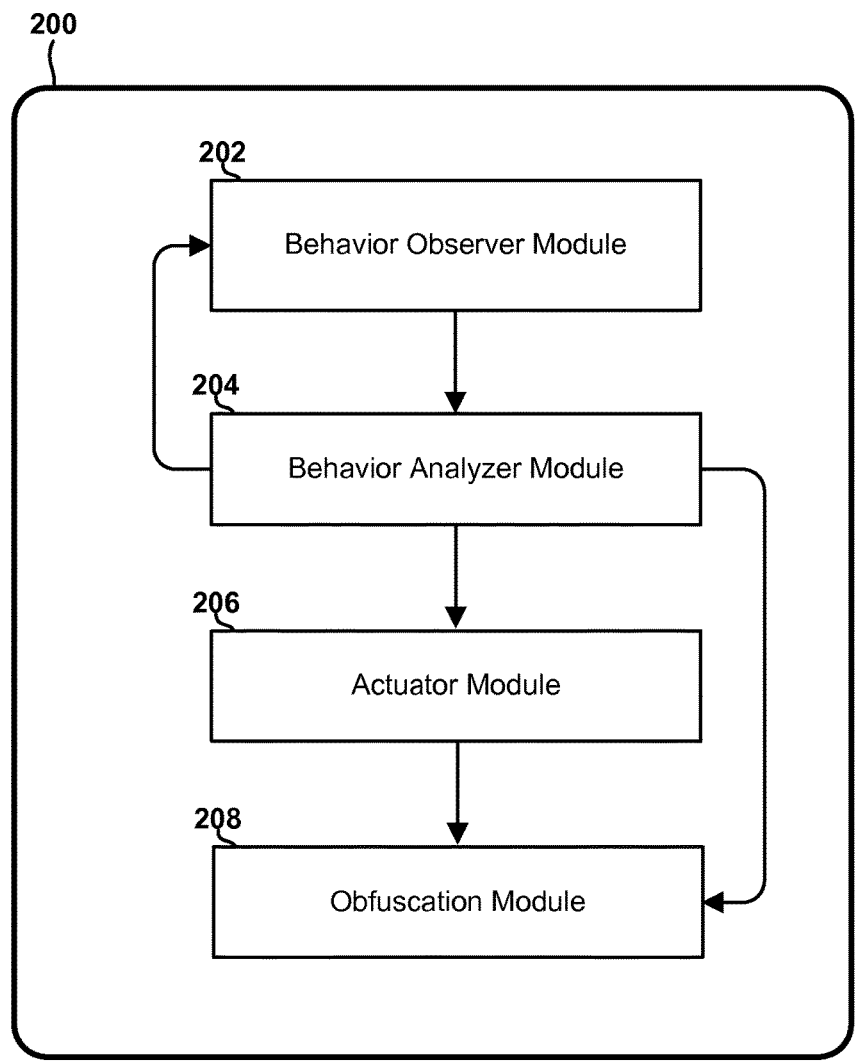
FIG. 2 is a block diagram illustrating example logical components and information flows in an aspect computing device configured to use behavioral analysis and machine learning techniques to classify behaviors and determine whether to perform obfuscation operations.

FIG. 2 illustrates example logical components and information flows in an aspect computing device 200 that includes a comprehensive behavioral monitoring and analysis system configured to use machine learning techniques to determine whether to a side channel attack is underway. In the example illustrated in FIG. 2, the computing device 200 includes a behavior observer module 202, a behavior analyzer module 204, an actuator module 206, and an obfuscation module 208.

Each of the modules 202-208 may be implemented in software, hardware, or any combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the computing device 200.

The behavior observer module 202 may be configured to instrument application programming interfaces (APIs) at various levels/modules of the device, and monitor the activities, conditions, operations, and events (e.g., system events, state changes, etc.) at the various levels/modules over a period of time via the instrumented APIs. The behavior observer module 202 may collect behavior information pertaining to the monitored activities, conditions, operations, or events, and store the collected information in a memory (e.g., in a log file, etc.). The behavior observer module 202 may also be configured to generate a behavior vector based on the collected information and send (e.g., via memory writes, function calls, etc.) the behavior vector to the behavior analyzer module 204 for analysis.

The behavior analyzer module 204 may be configured to use the stored behavior information the generate behavior vectors, and apply the generated or received behavior vectors to classifier modules to identify subsystems, processes, and/or applications that are contributing to (or are likely to contribute to) the device's degradation over time and/or which may otherwise cause problems on the device. As part of these operations, the behavior analyzer module 204 may also determine whether a side channel attack is underway. For example, the behavior analyzer module 204 may determine whether a monitored activity, condition, or behavior is indicative of a side channel attack.

The behavior analyzer module 204 may notify the actuator module 206 that an activity or behavior is not benign. In response, the actuator module 206 may perform various actions or operations to heal, cure, isolate, or otherwise fix identified problems. For example, the actuator module 206 may be configured to terminate a software application or process when the result of applying the behavior vector to the machine learning classifier model (e.g., by the analyzer module) indicates that the software application or process is not benign. In addition, the actuator module 206 may be configured to notify the obfuscation module 208 that a side channel attack is underway.

The obfuscation module 208 may be configured to perform a wide variety of obfuscation operations to protect the device from an ongoing side channel attack, including operations for raising the noise floor of the computing device. For example, the obfuscation module 208 may activate various hardware components (e.g., a fan, co-processor, etc.) and/or perform auxiliary operations that generate noise signals. The obfuscation module 208 may also perform operations that increase the number, volume, and/or strength of the noise signals emitted by the computing device 200. In an aspect, the obfuscation module 208 may be configured to perform obfuscation operations so as to only introduce additional obfuscation into the system during the performance of an ongoing critical activity. The obfuscation module 208 may also be configured to perform the obfuscation operations so as to only introduce additional or artificial obfuscation when there is not sufficient natural obfuscation to protect the computing device from side channel attacks during the ongoing critical activity.

The behavior observer module 202 may be configured to monitor the activities of the computing device 200 and/or the current levels of natural obfuscation (e.g., noise) produced by the measureable components of the computing device 200. In various aspects, this may be accomplishing by monitoring various software and hardware components of the computing device 200 and collecting information pertaining to the communications, transactions, events, or operations of the monitored and measurable components that are associated with the activities of the computing device 200. Such activities include a software application's performance of an operation or task, a software application's execution in a processing core of the computing device 200, the execution of process, the performance of a task or operation, a device behavior, the use of a hardware component, etc.

In various aspects, the behavior observer module 202 may be configured to monitor the activities of the computing device 200 by collecting information pertaining to library API calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the computing device 200 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the computing device 200 by monitoring the system resource usage, which may include monitoring the number of forks, memory access operations, number of files open, etc. The behavior observer module 202 may monitor the state of the computing device 200, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the computing device 200 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the computing device 200.

The behavior observer module 202 may also monitor the activities of the computing device 200 by monitoring one or more hardware counters that denote the state or status of the computing device 200 and/or computing device subsystems. A hardware counter may include a special-purpose register of the processors/cores that is configured to store a count value or state of hardware-related activities or events occurring in the computing device 200.

The behavior observer module 202 may also monitor the activities of the computing device 200 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the computing device 200 by monitoring transmissions or communications of the computing device 200, including communications that include voicemail (Voice-MailComm), device identifiers (DeviceIDComm), user account information (UserAccountComm), calendar information (CalendarComm), location information (Location-Comm), recorded audio information (RecordAudioComm), accelerometer information (AccelerometerComm), etc.

The behavior observer module 202 may also monitor the activities of the computing device 200 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the computing device 200 by monitoring conditions or events at multiple levels of the computing device 200, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the computing device 200 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the computing device 200. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the computing device 200 is in a holster may be relevant to recognizing suspicious behaviors, for example, because activities and functions related to active usage by a user (e.g., taking photographs or videos, sending messages, conducting a voice call, recording sounds, etc.) occurring while the computing device 200 is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the computing device 200, detecting that the computing device 200 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the computing device 200 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the computing device 200, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's degradation. In an aspect, the behavior observer module 202 may receive the initial set of behaviors and/or factors from a server and/or a component in a cloud service or network. In an aspect, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign.

A locally generated lean classifier model is a lean classifier model that is generated in the computing device. An application-specific classifier model is a classifier model that includes a focused data model that includes/tests only the features/entries that are most relevant for evaluating a particular software application. A device-specific classifier model is a classifier model that includes a focused data model that includes/tests only computing device-specific features/entries that are determined to be most relevant to classifying an activity or behavior in a specific computing device.

In the various aspects, any or all of the classifier models discussed in this application (e.g., full, local, device-specific, application-specific, etc.) may include, or may be, a "model of critical activity" or a "model of measurable components." A "model of critical activity" may be a classifier model that includes/tests the features/entries that are most relevant for determining whether an activity is a critical activity for which security is important and/or is vulnerable to side channel attacks. A "model of measurable components" may be a classifier model that includes/tests the features/entries that are most relevant for determining whether there is sufficient natural obfuscation in the system to defend against a side channel attack. This model may encompass a variety of measurements and/or include information suitable for determining obfuscation across multiple measureable components (i.e., multiple sensors, components, etc.). Further, this model is not required to include, measure, or use thresholds for every sensor that is evaluated.

The behavior analyzer module 204 may be configured to generate a behavior vector based on the monitored activities, and apply the generated behavior vector as a classifier model to determine whether a monitored behavior indicates that a side channel attack is underway. The behavior analyzer module 204 may also apply a model of critical activity to the generated behavior vector to determine whether a monitored activity is benign, suspicious, or an ongoing critical activity that is vulnerable to side channel attacks.

The behavior analyzer module 204 may be configured to notify the behavior observer module 202 in response to determining that a monitored activity or behavior is suspicious. In response, the behavior observer module 202 may adjust the granularity of its observations (i.e., the level of detail at which computing device features are monitored) and/or change the factors/behaviors that are observed based on information received from the behavior analyzer module 204 (e.g., results of the real-time analysis operations), generate or collect new or additional behavior information, and send the new/additional information to the behavior analyzer module 204 for further analysis/classification. Such feedback communications between the behavior observer module 202 and the behavior analyzer module 204 enable the computing device 200 to recursively increase the granularity of the observations (i.e., make finer or more detailed observations) or change the features/behaviors that are observed until an activity is classified, a source of a suspicious or performance-degrading computing device behavior is identified, until a processing or battery consumption threshold is reached, or until the computing device processor determines that the source of the suspicious or performance-degrading computing device behavior cannot be identified from further increases in observation granularity. Such feedback communication also enable the computing device 200 to adjust or modify the classifier models locally in the computing device without consuming an excessive amount of the computing device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the computing device 200 to efficiently identify and prevent problems without requiring a large amount of processor, memory, or battery resources on the device.

In various aspects, the behavior observer module 202 and/or the behavior analyzer module 204 may be configured to monitor, analyze, and/or classify activities or behaviors by identifying a critical data resource that requires close monitoring, identifying an intermediate resource associated with the critical data resource, monitoring API calls made by a software application when accessing the critical data resource and the intermediate resource, identifying computing device resources that are consumed or produced by the API calls, identifying a pattern of API calls as being indicative of non-benign activity by the software application, generating a light-weight behavior signature based on the identified pattern of API calls and the identified computing device resources, using the light-weight behavior signature to perform behavior analysis operations, and determining whether the software application is benign or not benign based on the behavior analysis operations.

In various aspects, the behavior observer module 202 and/or the behavior analyzer module 204 may be configured to monitor, analyze, and/or classify activities or behaviors by identifying APIs that are used most frequently by software applications executing on the computing device, storing information regarding usage of identified hot APIs in an API log in a memory of the computing device, and performing behavior analysis operations based on the information stored in the API log to identify behaviors that are inconsistent with normal operation patterns. In an aspect, the API log may be generated so that it is organized such that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various aspects, the behavior observer module 202 and/or the behavior analyzer module 204 may be configured to monitor, analyze, and/or classify activities or behaviors by receiving from a server a full classifier model that includes a finite state machine that is suitable for conversion or expression as a plurality of boosted decision stumps, generating a lean classifier model in the computing device based on the full classifier, and using the lean classifier model in the computing device to classify the activities or behaviors as being either benign or not benign (i.e., malicious, performance degrading, etc.). In an aspect, generating the lean classifier model based on the full classifier model may include determining a number of unique test conditions that should be evaluated to classify an activity or behavior without consuming an excessive amount of processing, memory, or energy resources of the computing device, generating a list of test conditions by sequentially traversing the list of boosted decision stumps and inserting the test condition associated with each sequentially traversed boosted decision stump into the list of test conditions until the list of test conditions includes the determined number of unique test conditions, and generating the lean classifier model to include only those boosted decision stumps that test one of a plurality of test conditions included in the generated list of test conditions.

In various aspects, the behavior observer module 202 and/or the behavior analyzer module 204 may be configured to monitor, analyze, and/or classify activities or behaviors by using device-specific information, such as capability and state information, of the computing device to identify device-specific test conditions in a plurality of test conditions that are relevant to classifying a behavior of the computing device, generating a lean classifier model that includes only the identified computing device-specific test conditions, and using the generated lean classifier model in the computing device to classify the behavior of the computing device. In an aspect, the lean classifier model may be generated to include only decision nodes that evaluate a computing device feature that is relevant to a current operating state or configuration of the computing device. In an aspect, generating the lean classifier model may include determining a number of unique test conditions that should be evaluated to classify the behavior without consuming an excessive amount of computing device's resources (e.g., processing, memory, or energy resources), generating a list of test conditions by sequentially traversing the plurality of test conditions in the full classifier model, inserting those test conditions that are relevant to classifying the behavior of the computing device into the list of test conditions until the list of test conditions includes the determined number of unique test conditions, and generating the lean classifier model to include decision nodes included in the full classifier model that test one of the conditions included in the generated list of test conditions.

In various aspects, the behavior observer module 202 and/or the behavior analyzer module 204 may be configured to monitor, analyze, and/or classify activities or behaviors by monitoring an activity of a software application or process, determining an operating system execution state of the software application/process, and determining whether the activity is a critical activity based the operating system execution state of the software application or process during which the activity was monitored. In an further aspect, the behavior observer module 202 and/or the behavior analyzer module 204 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is a critical activity and/or not benign.

In various aspects, the behavior observer module 202 and/or the behavior analyzer module 204 may be configured to monitor, analyze, and/or classify activities or behaviors by monitoring an activity of a software application or process, determining an application-and-operating-system-agnostic execution state of the software application/process, and determining whether the activity is a critical activity or not benign based on the activity and/or the application-and-operating-system-agnostic execution state of the software application during which the activity was monitored. In an further aspect, the behavior observer module 202 and/or the behavior analyzer module 204 may determine whether the application-and-operating-system-agnostic execution state of the software application is relevant to the activity, and generate a behavior vector that associates the activity with the application-and-operating-system-agnostic execution state, and use the behavior vector to determine whether the activity is a critical activity and/or not benign. The computing device may also use the application-and-operating-system-agnostic execution state to select a classifier model (e.g., application-specific classifier model), and apply the behavior vector to the selected classifier model to determine whether the activity is a critical activity and/or not benign.

In the various aspects, the computing device 200 may be configured to work in conjunction with a network server to intelligently and efficiently identify the features, factors, and data points that are most relevant to determining whether an activity is a critical activity and/or not benign. For example, the computing device 200 may be configured to receive a full classifier model from the network server, and use the received full classifier model to generate lean classifier models (i.e., data/behavior models) that are specific for the features and functionalities of the computing device or the software applications of the computing device. The computing device 200 may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the computing device 200 may be configured to generate one or more lean classifier models by converting a finite state machine representation/expression into boosted decision stumps, pruning or culling the full set of boosted decision stumps based on computing device-specific states, features, behaviors, conditions, or configurations to include subset or subsets of boosted decision stumps included in the full classifier model, and using the subset or subsets of boosted decision stumps to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an aspect, the computing device 200 may be configured to generate a lean classifier model that includes a subset of classifier criteria included in the full classifier model and only those classifier criteria corresponding to the features relevant to the computing device configuration, functionality and connected/included hardware. The computing device 200 may use this lean classifier model(s) to monitor only those features and functions present or relevant to the device. The computing device may then periodically modify or regenerate the lean classifier model(s) to include or remove various features and corresponding classifier criteria based on the computing device's current state and configuration.

As an example, the behavior analyzer module 204 may be configured to receive a large boosted-decision-stumps classifier model that includes decision stumps associated with a full feature set of behavior models (e.g., classifiers), and the behavior analyzer module 204 may derive one or more lean classifier models from the large classifier models by selecting only features from the large classifier model(s) that are relevant the computing device's current configuration, functionality, operating state and/or connected/included hardware, and including in the lean classifier model a subset of boosted decision stumps that correspond to the selected features. In this aspect, the classifier criteria corresponding to features relevant to the computing device may be those boosted decision stumps included in the large classifier model that test at least one of the selected features. The behavior analyzer module 204 may then periodically modify or regenerate the boosted decision stumps lean classifier model(s) to include or remove various features based on the computing device's current state and configuration so that the lean classifier model continues to include application-specific or device-specific feature boosted decision stumps.

In addition, the computing device 200 may also dynamically generate application-specific classifier models that identify conditions or features that are relevant to a specific software application (Google® wallet) and/or to a specific type of software application (e.g., games, navigation, financial, news, productivity, etc.). In an aspect, these classifier models may be generated to include a reduced and more focused subset of the decision nodes that are included in the full classifier model or of those included in lean classifier model generated from the received full classifier model.

In various aspects, the computing device 200 may be configured to generate application-based classifier models for each software application in the system and/or for each type of software application in the system. The computing device 200 may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various aspects, the computing device 200 may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various aspects, the computing device 200 may be configured to use information identifying the actual execution states in which certain tasks/activities are performed to focus its behavioral monitoring and analysis operations, and better determine whether an activity is a critical activity and/or whether the activity is not benign.

In various aspects, the behavior observer module 202 and/or the behavior analyzer module 204 may be configured to associate the activities/tasks performed by a software application with the execution states in which those activities/tasks were performed. For example, the behavior observer module 202 may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an aspect, this sub-vector/data-structure may be stored in association with a shadow feature value sub-vector/data-structure that identifies the execution state in which each feature/activity/operation was observed. As an example, the behavior observer module 202 may generate a behavior vector that includes a "location_background" data field whose value identifies the number or rate that the software application accessed location information when it was operating in a background state. This allows the behavior analyzer module 204 to analyze this execution state information independent of and/or in parallel with the other observed/monitored activities of the computing device. Generating the behavior vector in this manner also allows the system to aggregate information (e.g., frequency or rate) over time.

In various aspects, the behavior observer module 202 and/or the behavior analyzer module 204 may be configured to generate the behavior vectors to include information that may be input to a decision node in the machine learning classifier to generate an answer to a query regarding the monitored activity.

In various aspects, the behavior observer module 202 and/or the behavior analyzer module 204 may be configured to generate the behavior vectors to include a concise definition of the observed/monitored behaviors. The behavior vector may succinctly describe an observed behavior of the computing device, software application, or process in a value or vector data-structure (e.g., in the form of a string of numbers, etc.). The behavior vector may also function as an identifier that enables the computing device system to quickly recognize, identify, and/or analyze computing device behaviors.

In various aspects, the behavior observer module 202 and/or the behavior analyzer module 204 may be configured to generate the behavior vectors to include a plurality or series of numbers, each of which signifies or characterizes a feature, activity, or a behavior of the computing device 200. For example, numbers included in the behavior vector may signify whether a camera of the computing device is in use (e.g., as zero or one), how much network traffic has been transmitted from or generated by the computing device (e.g., 20 KB/sec, etc.), how many interne messages have been communicated (e.g., number of SMS messages, etc.), etc. In an aspect, the behavior vector may encapsulate one or more "behavior features." Each behavior feature may be an abstract number that represents all or a portion of an observed behavior or action. The behavior features may be agnostic to the hardware or software configuration of the computing device.

In various aspects, the behavior observer module 202 and/or the behavior analyzer module 204 may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

Figure 3:
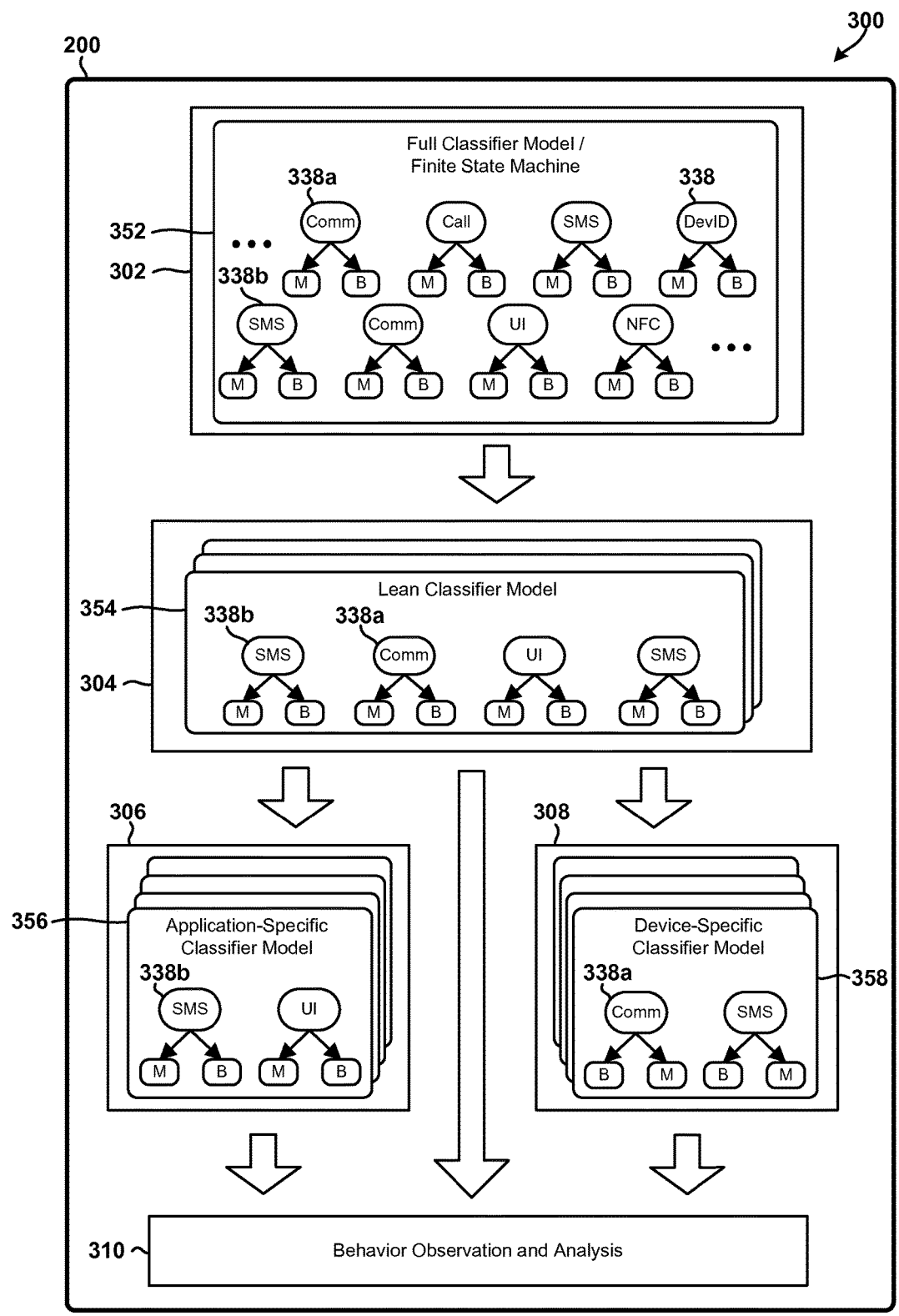
FIG. 3 is a block diagram illustrating example components and information flows in a computing device configured to generate different types of classifier models locally in the computing device in accordance with various aspects.

FIG. 3 illustrates an aspect method 300 of generating classifier models that may be used by the computing device to determine whether a side channel attack is underway. Method 300 may be performed by a processing core of a computing device 200.

In block 302, the processing core may receive or generate a full classifier model 352 that includes a large number of decision nodes 338. For example, in block 302, the processing core may generate a full classifier model 352 that includes one-hundred (100) decision nodes 338 that test forty (40) unique conditions or features. The decision nodes 338 may collectively identify, describe, test, or evaluate all or many of the features and data points that are relevant to determining whether a side channel attack is underway and/or whether a device behavior is otherwise not benign (i.e., contributing to the degradation in performance or power consumption characteristics of the computing device over time).

In an aspect, the decision nodes 338 may be decision stumps (e.g., boosted decision stumps, etc.). Each decision stump may be a one level decision tree that has exactly one node that tests one condition or feature. Because there is only one node in a decision stump, applying a feature vector to a decision stump results in a binary answer (e.g., yes or no, malicious or benign, etc.). For example, if the condition tested by a decision stump 338b is "is the frequency of SMS transmissions less than x per min," applying a value of "3" to the decision stump 338b will result in either a "yes" answer (for "less than 3" SMS transmissions) or a "no" answer (for "3 or more" SMS transmissions). This binary "yes" or "no" answer may then be used to classify the result as indicating that the behavior is either malicious/non-benign (M) or benign (B). Since these stumps are very simple evaluations (basically binary), the processing to perform each stump is very simple and can be accomplished quickly and/or in parallel with less processing overhead.

In an aspect, each decision node 338 may be associated a weight value that is indicative of how much knowledge is gained from answering the test question and/or the likelihood that answering the test condition will enable the processing core to determine whether a side channel attack is underway and/or whether a device behavior is otherwise not benign. The weight associated with a decision node 338 may be computed based on information collected from previous observations or analysis of activities, behaviors, software applications, or processes in the computing device 200. In an aspect, the weight associated with each decision node 338 may also be computed based on how many units of the corpus of data (e.g., cloud corpus of data or behavior vectors) are used to build the node. In an aspect, the weight values may be generated based on the accuracy or performance information collected from the execution/application of previous data/behavior models or classifiers.

In block 304, the processing core may generate a lean classifier model 354 that includes a focused subset of the decision nodes 338 included in the full classifier model 352. As part of these operations, the processing core may perform feature selection operations, which may include generating an ordered or prioritized list of the decision nodes 338 included in the full classifier model 352, determining a number of unique test conditions that should be evaluated to classify a behavior without consuming an excessive amount of processing, memory, or energy resources of the computing device, generating a list of test conditions by sequentially traversing the ordered/prioritized list of decision nodes 338 and inserting a test condition associated with each sequentially traversed decision node 338 into the list of test conditions until the list of test conditions includes the determined number of unique test conditions, and generating an information structure that preferentially or exclusively includes the decision nodes 338 that test one of the test conditions included in the generated list of test conditions. In an aspect, the processing core may generate a family classifier models so that each model 354 in the family of classifier models evaluates a different number of unique test conditions and/or includes a different number of decision nodes.

In block 306, the processing core may trim, cull, or prune the decision nodes (i.e., boosted decision stumps) included in one of the lean classifier models 354 to generate an application-specific classifier model 356 that preferentially or exclusively includes the decision nodes in the lean classifier model 354 that test or evaluate conditions or features that are relevant to a specific software application (i.e., Google® wallet), such as by dropping decision nodes that address API's or functions that are not called or invoked by the application, as well as dropping decision nodes regarding device resources that are not accessed or modified by the application. In an aspect, the processing core may generate the application-specific classifier model 356 by performing feature selection and culling operations.

In various aspects, the processing core may identify decision nodes 338 for inclusion in a application-specific classifier model 356 based on labeling information associated with a software application, the results of performing static analysis operations on the application, the results of performing install time analysis of the application, by evaluating the operating system, file, and/or access permissions of the software application, by evaluating the API usage of the application, etc. In an aspect, the labeling information may identify an activity, type of activity, a software application, or a type of software application as being (or being associated with) a critical activity that is vulnerable to side channel attacks. The processing core may also determine the category, type, or classification of each software application and/or identify the decision nodes 338 that are to be included in a application-specific classifier model 356 by reading an application store label associated with the software application, by performing static analysis operations, and/or by comparing the software application to other similar software applications.

In an aspect, in block 306, the processing core may generate a plurality of application-specific classifier models 356, each of which evaluate a different software application. In various aspects, the application-specific classifier models 356 may be (or may include) a model of measureable components, a model of critical activity, or a combination thereof. In an aspect, the processing core may generate an application-specific classifier model 356 for every software application in the system and/or so that every application running on the computing has its own active classifier. In an aspect, in block 306, the processing core may generate a family of application-specific classifier models 356, and each application-specific classifier model 356 in the family of application-specific classifier models 356 may evaluate a different combination or number of the features that are relevant to a single software application.

In block 308, the processing core may generate a plurality of device-specific classifier models 358, each of which evaluate device-specific features that are relevant to a current operating state, type, or configuration of the computing device 200. In various aspects, the device-specific classifier models 358 may be (or may include) a model of measureable components, a model of critical activity, or a combination thereof. As part of the operations for generating the device-specific classifier models 358 in block 308, the processing core may determine a number of unique test conditions that should be evaluated to classify an activity or behavior without consuming an excessive amount of processing, memory, or energy resources of the computing device, generate a list of test conditions by sequentially traversing the plurality of test conditions in the lean classifier model 354 and inserting those test conditions that are relevant to classifying the activity or behavior into the list of test conditions until the list of test conditions includes the determined number of unique test conditions, and generating the device-specific classifier models 358 to include the decision nodes in the lean classifier model 354 that test one of the conditions included in the generated list of test conditions.

In block 310, the processing core may use one or any combination of the locally generated classifier models 354, 356, 358 to perform real-time behavior monitoring and analysis operations, and predict whether a complex computing device behavior is not benign, whether an activity is a critical activity, and/or whether there is sufficient natural obfuscation to prevent a side channel attack. In an aspect, the computing device may be configured use or apply multiple classifier models 354, 356, 358 in parallel. In an aspect, the processing core may give preference or priority to the results generated from applying or using application-based classifier models 356 and device-specific classifier models 358 over the results generated from applying/using the lean classifier model 354.

By dynamically generating the classifier models locally in the computing device to account for application and device specific features and/or functionality, the various aspects allow the computing device to focus its monitoring operations on a small number of features that are most important for determining whether to perform obfuscation operations. Further, by using the real-time behavior monitoring and analysis to apply classifier models that include the models of measureable components and critical activities, the various aspects allow the computing device to intelligently determine whether to perform obfuscation operations without performing a significant number of additional operations. This improves the performance and power consumption characteristics of the computing device, and allows the computing device to perform the real-time behavior monitoring and analysis operations continuously or near continuously without consuming an excessive amount of its processing, memory, or energy resources.

Figure 4:
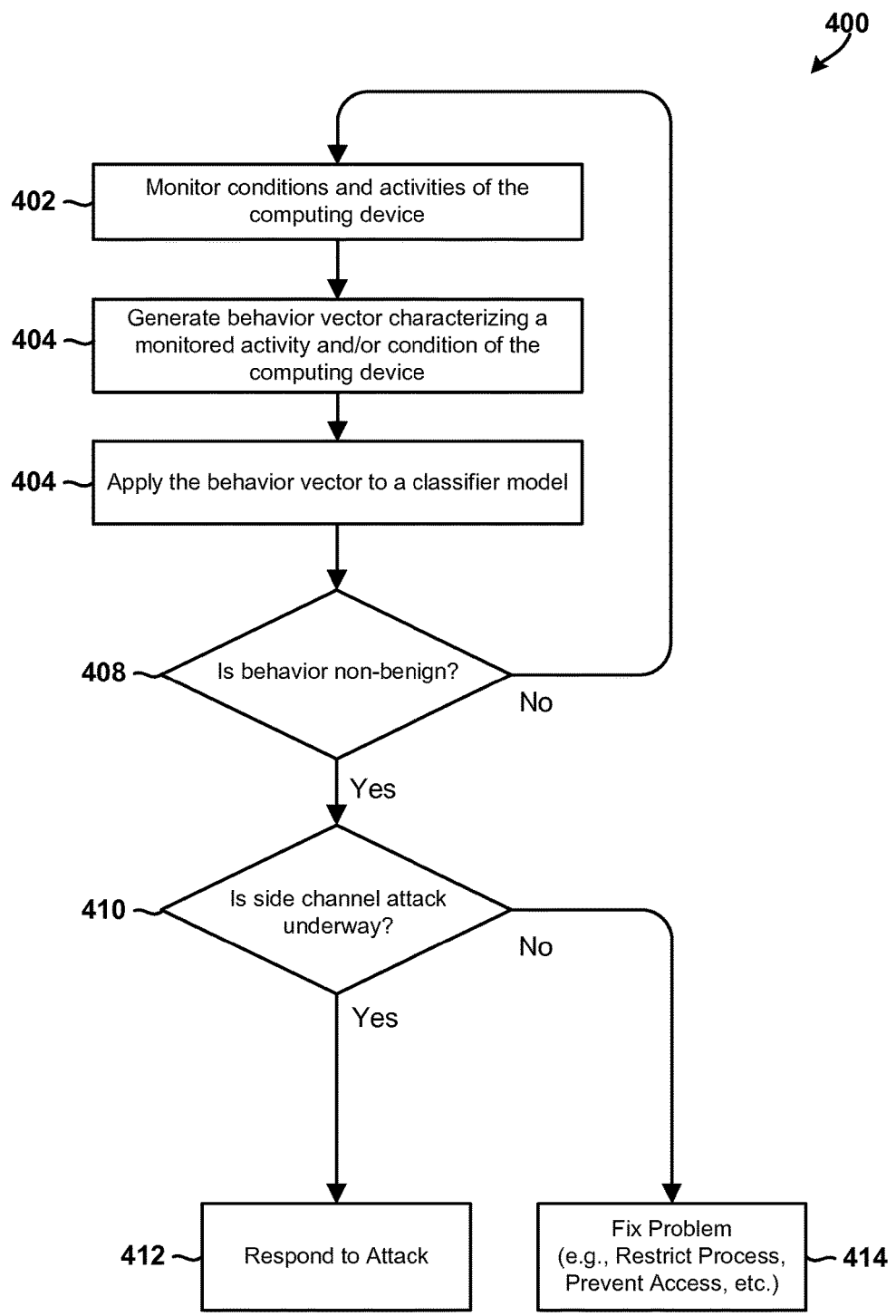
FIG. 4 is a process flow diagram illustrating a method of intelligently determining whether a side channel attack is underway in accordance with an aspect.

FIG. 4 illustrates an aspect method 400 of determining whether to a side channel attack is underway. Method 400 may be performed by a processing core of a computing device, such a mobile computing device.

In block 402, the processing core may monitor activities of the computing device, such as by performing any of the operations of the behavior observation module 202 discussed above with reference to FIG. 2. In block 404, the processing core may generate a behavior vector characterizing a monitored activity. In block 406, the processing core may apply the generated behavior vector to a classifier model. In determination block 408, the processing core may use the results of applying the generated behavior vector to a classifier model to determine whether a device behavior is non-benign, such as by performing any of the operations of the analyzer module 204 discussed above with reference to FIG. 2. In response to determining that the monitored activity is benign (i.e., determination block 408="No"), the processing core may continue monitoring activities of the computing device in block 402.

In response to determining that the monitored activity is non-benign (i.e., determination block 408="Yes"), in determination block 410, the processing core may determine whether there is a high probability that a side channel attack is underway. For example, the processing core may determine that there is a high probability that a side channel attack is underway in response to determining that the computing device has been placed in airplane mode, the battery has been replaced with a stable DC power supply, the touchscreen has been disconnected, that there are continuous calls to a cipher API, that there has been tampering with the behavioral analysis engine of the mobile device, or a combination of two or more of these conditions or events.

In response to determining that there is a high probability that a side channel attack is underway (i.e., determination block 410="Yes"), the processing core may perform operations to respond to the side channel attack, such as by performing obfuscation operations or ceasing an activity. In response to determining that there is not a high probability that a side channel attack is underway (i.e., determination block 410="No"), in block 412, the processing core may perform various operations to fix the problem, such as by restricting a process, preventing access to resources, etc.

Figure 5:
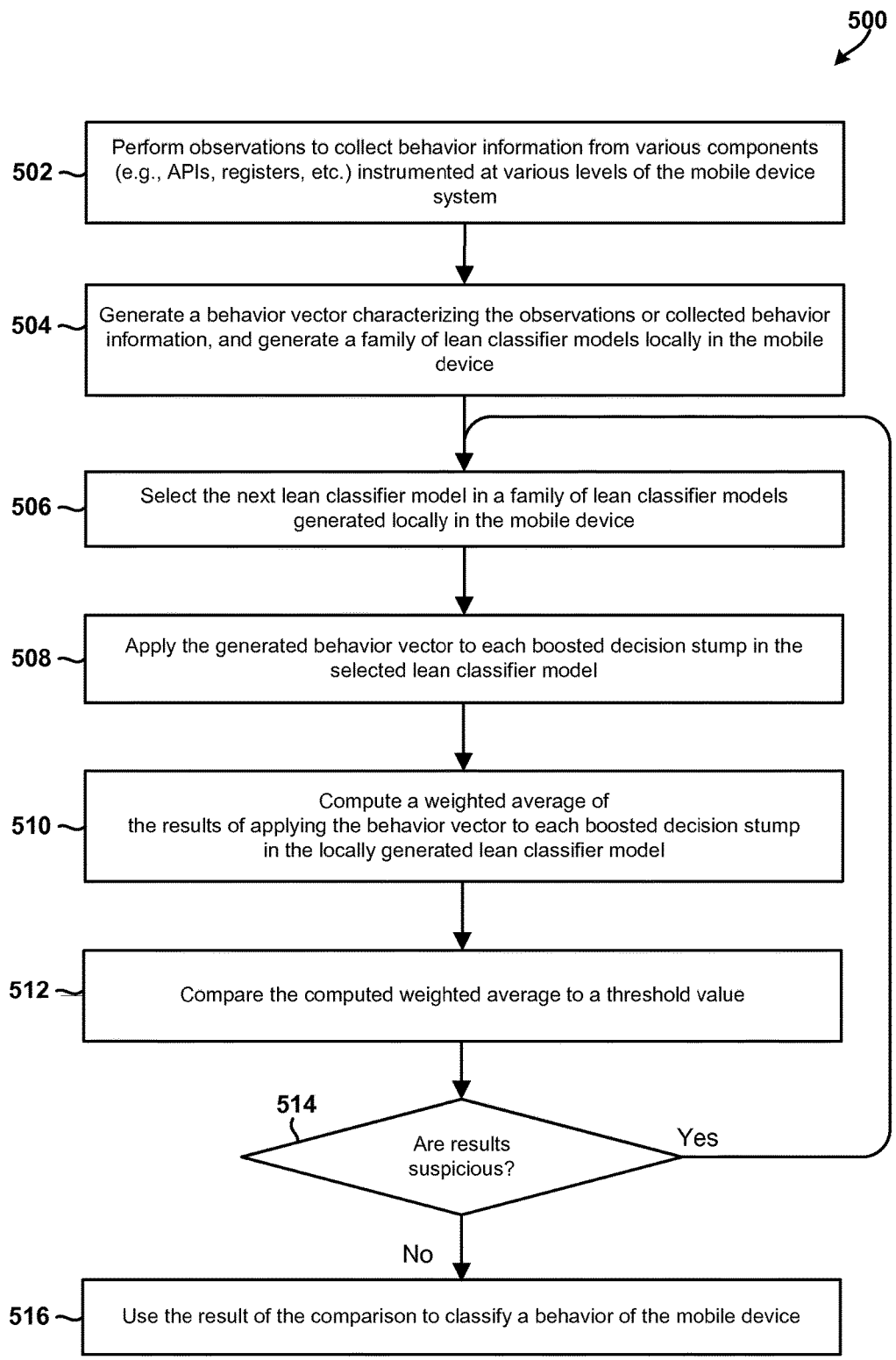
FIG. 5 is a process flow diagram illustrating an aspect method of generating an application-based or lean classifier models in a computing device.

FIG. 5 illustrates an aspect method 500 of using a lean classifier model to classify a behavior of the mobile device and determine whether a side channel attack is underway. Method 500 may be performed by a processing core in a computing device, such as a mobile computing device.

In block 502, the processing core my perform observations to collect behavior information from various components that are instrumented at various levels of the device system. In an aspect, this may be accomplished via the behavior observer module 202 discussed above with reference to FIG. 2. In block 504, the processing core may generate a behavior vector characterizing the observations, the collected behavior information, and/or a device behavior. Also in block 504, the processing core may use a full classifier model received from a network server to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 506, the processing core may select the leanest classifier in the family of lean classifier models (i.e., the model based on the fewest number of different mobile device states, features, behaviors, or conditions) that has not yet been evaluated or applied by the computing device. In an aspect, this may be accomplished by the processing core selecting the first classifier model in an ordered list of classifier models.

In block 508, the processing core may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector applied in block 530 may be truncated or filtered to just include the limited number of test condition parameters included in the lean classifier model, thereby further reducing the computational effort in applying the model.

In block 510, the processing core may compute or determine a weighted average of the results of applying the collected behavior information to each boosted decision stump in the lean classifier model. In block 512, the processing core may compare the computed weighted average to a threshold value or values that indicate whether the observed behaviors are likely benign or not benign and/or likely critical activities or not critical activities. In other words, the thresholds applied in block 512 to weighted average results may be used by the processing core to determine whether a firm classification of criticality or threat can be made using the applied lean classifier model. In determination block 514, the processing core may determine whether the results of this comparison and/or the results generated by applying the selected lean classifier model are suspicious. For example, the processing core may determine whether these results may be used to classify a behavior as malicious, associated with a side channel attack, or benign with a high degree of confidence, and if not treat the behavior as suspicious.

If the processing core determines that the results are unable to classify an activity as critical or non-critical or that a behavior is suspicious (i.e., determination block 514="No"), the processing core may repeat the operations in blocks 506-512 to select and apply a stronger (i.e., less lean) classifier model that evaluates more device states, features, behaviors, or conditions until the behavior is classified as malicious or benign with a high degree of confidence. In other words, in the operations in block 512 and determination block 514 the processing core may determine whether the results of applying a lean classifier may be used to classify with a high degree of confidence that an activity as critical or not critical and/or that a behavior as either malicious or benign, and if not repeat the analysis using a stronger lean classifier model.

If the processing core determines that the results are not suspicious (e.g., determination block 514="Yes"), such as by determining that the behavior can be classified as malicious, associated with a side channel attack, or benign with a high degree of confidence, in block 516, the processing core may use the result of the comparison generated in block 512 to classify an activity as either critical or non-critical for purposes of assessing the need for obfuscation actions, and/or a behavior of the computing device as benign or potentially malicious for purposes of taking corrective actions.

In an alternative aspect method, the operations described above may be accomplished by sequentially selecting a boosted decision stump that is not already in the lean classifier model; identifying all other boosted decision stumps that depend upon the same computing device state, feature, behavior, or condition as the selected decision stump (and thus can be applied based upon one determination result); including in the lean classifier model the selected and all identified other boosted decision stumps that that depend upon the same device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

The operations of classifying activities as either non-critical (in which case obfuscation actions are unnecessary) or critical (in which case a determination of a need for obfuscation actions may be made) may be used for countering side channel attacks, and may be accomplished using the same or similar behavior analysis processes for monitoring device behaviors to recognize non-benign (e.g., malicious or performance degrading) for purposes of taking corrective actions.

Figure 6:
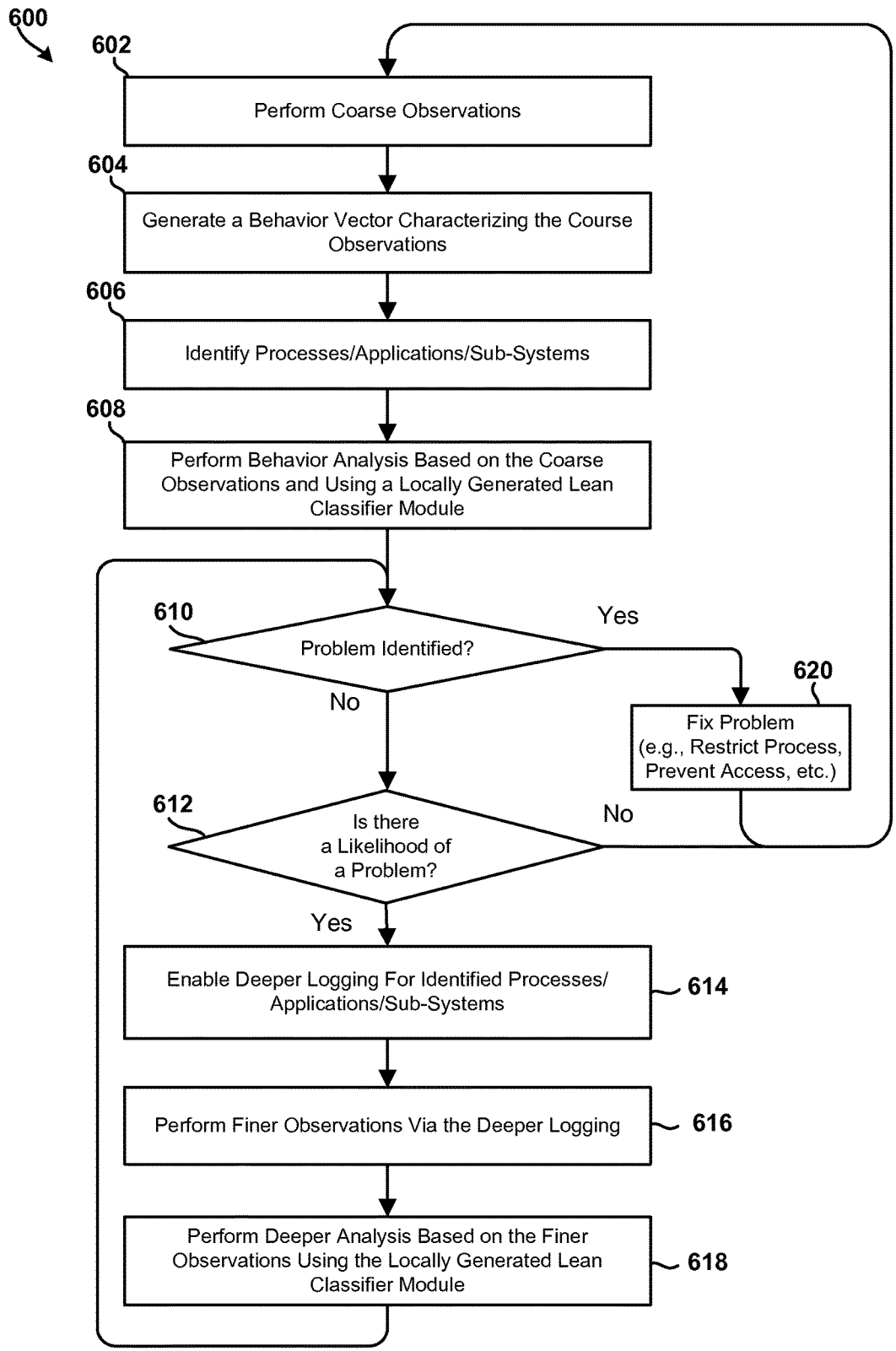
FIG. 6 is a process flow diagram illustrating an aspect method for performing adaptive observations on computing devices to determine whether an activity or behavior is not benign.

FIG. 6 illustrates an example method 600 for performing dynamic and adaptive observations to identify and rectify non-benign (e.g., malicious or performance degrading) behaviors. Method 600 may be performed by a processing core in a computing device, such as a mobile computing device.

In block 602, the processing core may perform coarse observations by monitoring/observing a subset of a large number factors/behaviors that could contribute to the computing device's degradation over time. In block 604, the processing core may generate a behavior vector characterizing the coarse observations and/or the computing device behavior based on the coarse observations. In block 606, the processing core may identify subsystems, processes, and/or applications associated with the coarse observations that may potentially contribute to the computing device's degradation. This may be achieved, for example, by comparing information received from multiple sources with contextual information received from sensors of the computing device. In block 608, the processing core may perform behavioral analysis operations based on the coarse observations. In an aspect, as part of blocks 604 and 606, the processing core may perform one or more of the operations discussed above with reference to FIGS. 2-5.

In determination block 610, the processing core may determine whether suspicious behaviors or potential problems can be identified and corrected based on the results of the behavioral analysis. When the processing core determines that the suspicious behaviors or potential problems can be identified and corrected based on the results of the behavioral analysis (i.e., determination block 810="Yes"), in block 620, the processing core may initiate operations to correct the behavior and return to block 602 to perform additional coarse observations.

When the processing core determines that the suspicious behaviors or potential problems cannot be identified and/or corrected based on the results of the behavioral analysis (i.e., determination block 610="No"), in determination block 612 the processing core may determine whether there is a likelihood of a problem. In an aspect, the processing core may determine that there is a likelihood of a problem by computing a probability of the computing device encountering potential problems and/or engaging in suspicious behaviors, and determining whether the computed probability is greater than a predetermined threshold. When the processing core determines that the computed probability is not greater than the predetermined threshold and/or there is not a likelihood that suspicious behaviors or potential problems exist and/or are detectable (i.e., determination block 612="No"), the processor may return to block 602 to perform additional coarse observations.

When the processing core determines that there is a likelihood that suspicious behaviors or potential problems exist and/or are detectable (i.e., determination block 612="Yes"), in block 614, the processing core may perform deeper logging/observations or final logging on the identified subsystems, processes or applications. In block 616, the processing core may perform finer, deeper and more detailed observations on the identified subsystems, processes or applications. In block 618, the processing core may perform further and/or deeper behavioral analysis based on the deeper and more detailed observations. In determination block 610, the processing core may again determine whether the suspicious behaviors or potential problems can be identified and corrected based on the results of the deeper behavioral analysis. When the processing core determines that the suspicious behaviors or potential problems cannot be identified and corrected based on the results of the deeper behavioral analysis (i.e., determination block 610="No"), the processor may repeat the operations in blocks 612-618 until the level of detail is fine enough to identify the problem or until it is determined that the problem cannot be identified with additional detail or that no problem exists.

In an aspect, as part of blocks 602-618 of method 600, the processing core may perform real-time behavior analysis of the system's behaviors to identify suspicious behaviors from limited and coarse observations, to dynamically determine the behaviors to observe in greater detail, and to dynamically determine the precise level of detail required for the observations. This enables the processing core to efficiently identify and prevent problems from occurring, without requiring the use of a large amount of processor, memory, or battery resources on the device.

In the various aspects, the computing device may be configured to use any of a variety of obfuscation and actuation techniques to protect a computing device from an ongoing side channel attack. For example, the computing device may terminate or quarantine a software application that is subject to the attack. The computing device may also perform obfuscation operations to ensure that the noise floor of the computing device (i.e., sum of all the noise signals generated by the computing device) is high enough so that an attacker device cannot readily identify and measure the sounds, fields, or signals generated by a specific activity in the device over time. This prevents the attacker device from gaining useful information from the changes in observable signal emissions (e.g., sounds, magnetic fields, heat, etc.) and/or makes it more difficult for the attacker device to determine the precise operations performed by the attacked device.

In the various aspects, the obfuscation operations may include operations for increasing the number, volume, and/or strength of the noise signals emitted by the computing device, which may be accomplished by activating hardware components (e.g., a fan, a co-processor, etc.) or performing auxiliary operations that generate noise signals. A noise signal may be any observable signal emission (e.g., sound, magnetic field, heat, etc.) other than that which is generated by an ongoing critical activity.

Figure 7:
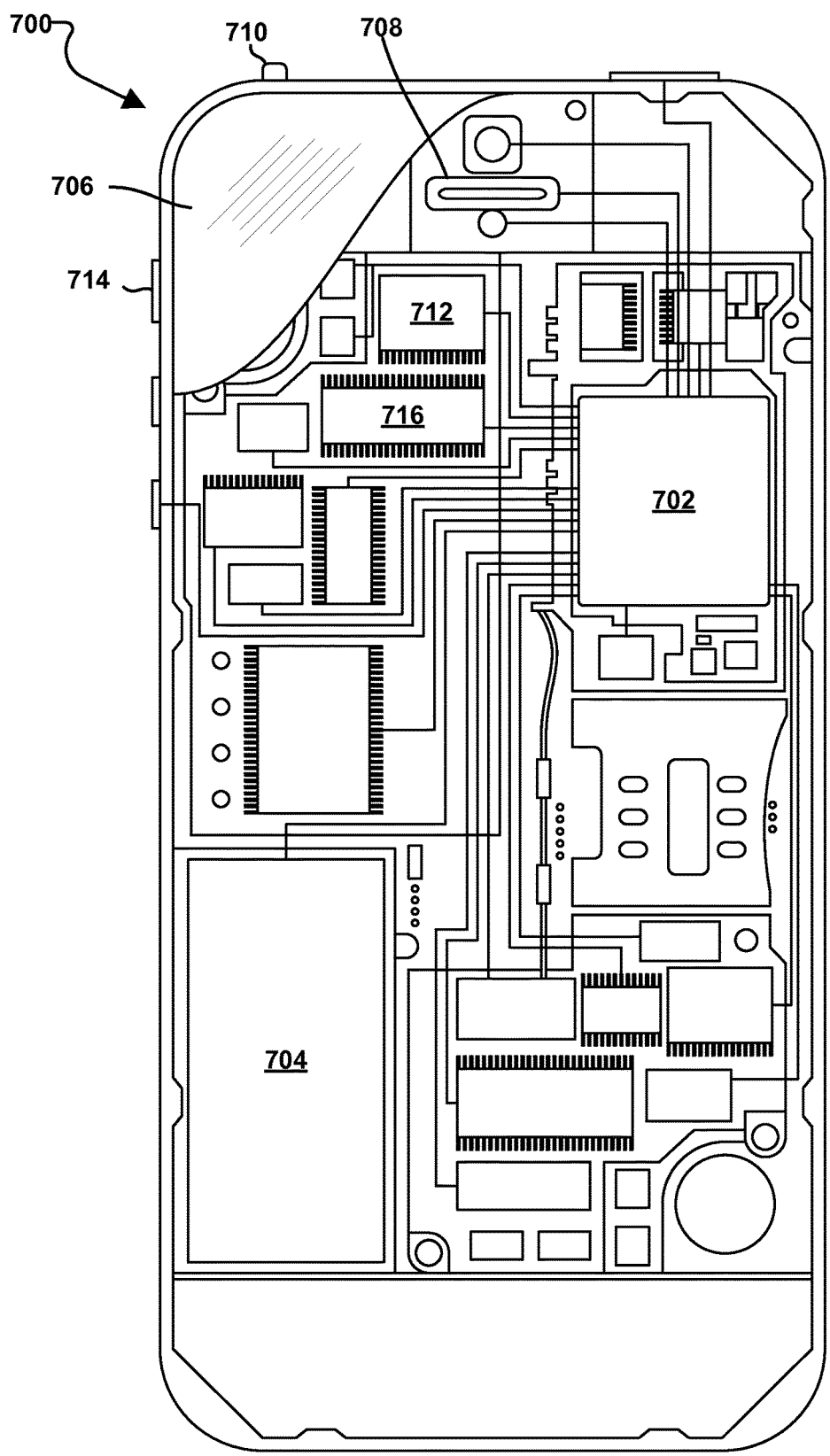
FIG. 7 is a component block diagram of a mobile device suitable for use in an aspect.

The various aspects may be implemented on a variety of computing devices, an example of which is illustrated in FIG. 7. Specifically, FIG. 7 is a system block diagram of a mobile computing device in the form of a smartphone/cell phone 700 suitable for use with any of the aspects. The cell phone 700 may include a processor 702 coupled to internal memory 704, a display 706, and to a speaker 708. Additionally, the cell phone 700 may include an antenna 710 for sending and receiving electromagnetic radiation that may be connected to a wireless data link and/or cellular telephone transceiver 712 coupled to the processor 702. Cell phones 700 typically also include menu selection buttons or rocker switches 714 for receiving user inputs.

A typical cell phone 700 also includes a sound encoding/decoding (CODEC) circuit 716 that digitizes sound received from a microphone into data packets suitable for wireless transmission and decodes received sound data packets to generate analog signals that are provided to the speaker 708 to generate sound. Also, one or more of the processor 702, wireless transceiver 712 and CODEC 716 may include a digital signal processor (DSP) circuit (not shown separately). The cell phone 700 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 8:
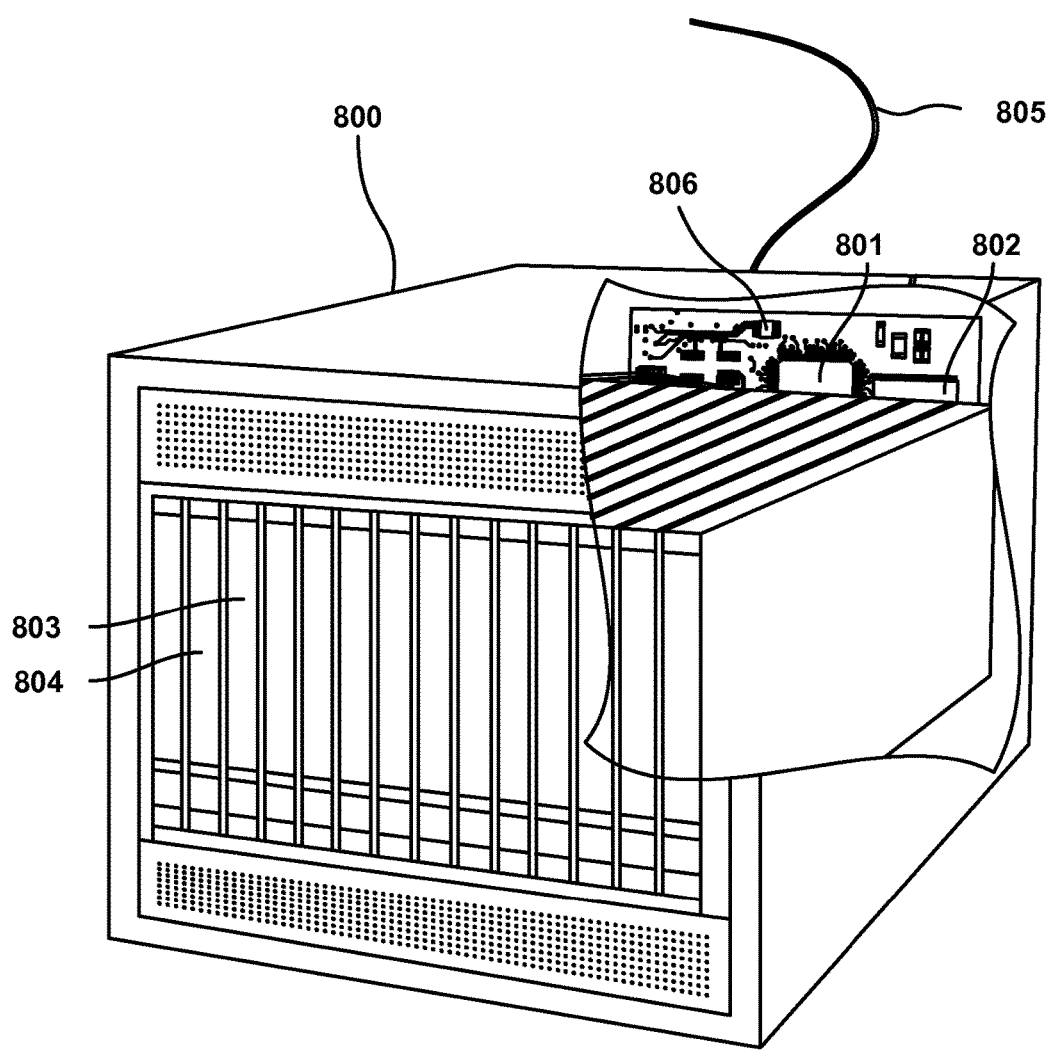
FIG. 8 is a component block diagram of a server device suitable for use in an aspect.

The aspects and network servers described above may be implemented in variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other communication system computers and servers.

The processors 702, 801, may be any programmable microprocessor, microcomputer or multiple processor chip or chips that can be configured by software instructions (applications) to perform a variety of functions, including the functions of the various aspects described below. In some mobile devices, multiple processors 702 may be provided, such as one processor dedicated to wireless communication functions and one processor dedicated to running other applications. Typically, software applications may be stored in the internal memory 704, 802, before they are accessed and loaded into the processor 902, 801. The processor 702, 801 may include internal memory sufficient to store the application software instructions. In some servers, the processor 801 may include internal memory sufficient to store the application software instructions. In some receiver devices, the secure memory may be in a separate memory chip coupled to the processor 801. The internal memory 704, 802 may be a volatile or nonvolatile memory, such as flash memory, or a mixture of both. For the purposes of this description, a general reference to memory refers to all memory accessible by the processor 702, 801, including internal memory 704, 802, removable memory plugged into the device, and memory within the processor 702, 801 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of detecting side channel attacks in a computing device, comprising:
   receiving a full classifier model that includes a plurality of decision nodes;
   monitoring an activity of the computing device over a time period to collect behavior information;
   using the collected behavior information to generate a behavior vector information structure that includes a plurality of numerical values that characterize the monitored activity;
   culling the received full classifier model to generate a lean classifier model;
   applying the generated behavior vector information structure to the lean classifier model, the lean classifier model including a plurality of decision nodes that collectively test a plurality of different conditions in the computing device, each decision node including a weight value and a corresponding test condition, each weight value indicating a likelihood that an answer to the corresponding test condition will allow the computing device to determine whether a side channel attack is underway; and
   determining whether the side channel attack is underway based on analysis results generated by applying the generated behavior vector information structure to the lean classifier model.

2. The method of claim 1, wherein determining whether the side channel attack is underway based on the analysis results generated by applying the generated behavior vector information structure to the lean classifier model comprises determining two or more of:
   whether the computing device is in airplane mode;
   whether a battery of the computing device the battery has been replaced with a stable DC power supply;
   whether a touch-screen display of the computing device has been disconnected; and
   whether there are repeated calls to a cipher application programming interface (API) within the time period.

3. The method of claim 2, further comprising:
   performing an obfuscation operation in response to determining that the side channel attack is underway.

4. The method of claim 2, further comprising:
   terminating the monitored activity in response to determining that the side channel attack is underway.

5. The method of claim 2, wherein monitoring the activity of the computing device over the time period to collect behavior information comprises:
   determining a feature that is to be observed in the computing device in order to identify the side channel attack; and
   collecting the behavior information from a hardware component associated with the determined feature.

6. The method of claim 5, wherein collecting the behavior information from the hardware component associated with the feature comprises collecting information from a log of API calls that stores API call information for use of the hardware component by software applications of the computing device.

7. The method of claim 2, further comprising:
   applying machine learning techniques to generate a first family of classifier models that describe a cloud corpus of behavior vectors;
   determining which factors in the first family of classifier models have a high probability of enabling the computing device to conclusively determine whether a behavior is indicative of a side channel attack;
   generating a second family of classifier models that identify fewer factors and data points as being relevant for enabling the computing device to determine whether the behavior is indicative of a side channel attack; and
   generating the lean classifier model based on the second family of classifier models.

8. A computing device, comprising:
   means for receiving a full classifier model that includes a plurality of decision nodes;
   means for monitoring an activity of the computing device over a time period to collect behavior information;
   means for using the collected behavior information to generate a behavior vector information structure that includes a plurality of numerical values that characterize the monitored activity;

means for culling the received full classifier model to generate a lean classifier model;

means for applying the generated behavior vector information structure to the lean classifier model, the lean classifier model including a plurality of decision nodes that collectively test a plurality of different conditions in the computing device, each decision node including a weight value and a corresponding test condition, each weight value indicating a likelihood that an answer to the corresponding test condition will allow the computing device to determine whether a side channel attack is underway; and means for determining whether the side channel attack is underway based on analysis results generated by applying the generated behavior vector information structure to the lean classifier model.

9. The computing device of claim 8, wherein means for determining whether the side channel attack is underway based on the analysis results generated by applying the generated behavior vector information structure to the lean classifier model comprises means for determining two or more of:

whether the computing device is in airplane mode;

whether a battery of the computing device the battery has been replaced with a stable DC power supply;

whether a touch-screen display of the computing device has been disconnected; and whether there are repeated calls to a cipher application programming interface (API) within the time period.

10. The computing device of claim 9, further comprising:

means for performing an obfuscation operation in response to determining that the side channel attack is underway.

11. The computing device of claim 9, further comprising:

means for terminating the monitored activity in response to determining that the side channel attack is underway.

12. The computing device of claim 9, wherein means for monitoring the activity of the computing device over the time period to collect behavior information comprises:

means for determining a feature that is to be observed in the computing device in order to identify the side channel attack; and means for collecting the behavior information from a hardware component associated with the determined feature.

13. The computing device of claim 12, wherein means for collecting the behavior information from the hardware component associated with the feature comprises means for collecting information from a log of API calls that stores API call information for use of the hardware component by software applications of the computing device.

14. The computing device of claim 9, wherein means for culling the received full classifier model to generate a lean classifier model comprises:

means for applying machine learning techniques to generate a first family of classifier models that describe a cloud corpus of behavior vectors;

means for determining which factors in the first family of classifier models have a high probability of enabling the computing device to conclusively determine whether a behavior is indicative of a side channel attack;

means for generating a second family of classifier models that identify fewer factors and data points as being relevant for enabling the computing device to determine whether the behavior is indicative of a side channel attack; and means for generating the lean classifier model based on the second family of classifier models.

15. A computing device, comprising:

a memory;

a processor coupled to the memory, wherein the processor is configured with processor-executable instructions to perform operations further comprising:

receiving a full classifier model that includes a plurality of decision nodes;

monitoring an activity of the computing device over a time period to collect behavior information;

using the collected behavior information to generate a behavior vector information structure that includes a plurality of numerical values that characterize the monitored activity;

culling the received full classifier model to generate a lean classifier model;

applying the generated behavior vector information structure to the lean classifier model, the lean classifier model including a plurality of decision nodes that collectively test a plurality of different conditions in the computing device, each decision node including a weight value and a corresponding test condition, each weight value indicating a likelihood that an answer to the corresponding test condition will allow the computing device to determine whether a side channel attack is underway; and determining whether the side channel attack is underway based on analysis results generated by applying the generated behavior vector information structure to the lean classifier model.

16. The computing device of claim 15, wherein the processor is configured with processor-executable instructions to perform operations such that determining whether the side channel attack is based on the analysis results generated by applying the generated behavior vector information structure to the lean classifier model comprises determining two or more of:

whether the computing device is in airplane mode;

whether a battery of the computing device the battery has been replaced with a stable DC power supply;

whether a touch-screen display of the computing device has been disconnected; and whether there are repeated calls to a cipher application programming interface (API) within the time period.

17. The computing device of claim 16, wherein the processor is configured with processor-executable instructions to perform operations further comprising:

performing an obfuscation operation in response to determining that the side channel attack is underway.

18. The computing device of claim 16, wherein the processor is configured with processor-executable instructions to perform operations further comprising:

terminating the monitored activity in response to determining that the side channel attack is underway.

19. The computing device of claim 16, wherein the processor is configured with processor-executable instructions to perform operations such that monitoring the activity of the computing device over the time period to collect behavior information comprises:

determining a feature that is to be observed in the computing device in order to identify the side channel attack; and collecting the behavior information from a hardware component associated with the determined feature.

20. The computing device of claim 19, wherein the processor is configured with processor-executable instructions to perform operations such that collecting the behavior information from the hardware component associated with the feature comprises collecting information from a log of API calls that stores API call information for use of the hardware component by software applications of the computing device.

21. The computing device of claim 16, wherein the processor is configured with processor-executable instructions to perform operations such that culling the received full classifier model to generate a lean classifier model further comprises:
applying machine learning techniques to generate a first family of classifier models that describe a cloud corpus of behavior vectors;
determining which factors in the first family of classifier models have a high probability of enabling the computing device to conclusively determine whether a behavior is indicative of a side channel attack;
generating a second family of classifier models that identify fewer factors and data points as being relevant for enabling the computing device to determine whether the behavior is indicative of a side channel attack; and
generating the lean classifier model based on the second family of classifier models.

22. A non-transitory computer readable storage medium having stored thereon processor-executable software instructions configured to cause a processor of a computing device to perform operations for detecting side channel attacks, the operations comprising:
receiving a full classifier model that includes a plurality of decision nodes;
monitoring an activity of the computing device over a time period to collect behavior information;
using the collected behavior information to generate a behavior vector information structure that includes a plurality of numerical values that characterize the monitored activity;
culling the received full classifier model to generate a lean classifier model;
applying the generated behavior vector information structure to the lean classifier model, the lean classifier model including a plurality of decision nodes that collectively test a plurality of different conditions in the computing device, each decision node including a weight value and a corresponding test condition, each weight value indicating a likelihood that an answer to the corresponding test condition will allow the computing device to determine whether a side channel attack is underway; and
determining whether the side channel attack is underway based on analysis results generated by applying the generated behavior vector information structure to the lean classifier model.

23. The non-transitory computer readable storage medium of claim 22, wherein the stored processor-executable software instructions are configured to cause a processor to perform operations such that determining whether the side channel attack is underway based on the analysis results generated by applying the generated behavior vector information structure to the lean classifier model comprises determining two or more of:

whether the computing device is in airplane mode;
whether a battery of the computing device the battery has been replaced with a stable DC power supply;
whether a touch-screen display of the computing device has been disconnected; and
whether there are repeated calls to a cipher application programming interface (API) within the time period.

24. The non-transitory computer readable storage medium of claim 23, wherein the stored processor-executable software instructions are configured to cause a processor to perform operations further comprising:
performing an obfuscation operation in response to determining that the side channel attack is underway.

25. The non-transitory computer readable storage medium of claim 23, wherein the stored processor-executable software instructions are configured to cause a processor to perform operations further comprising:
terminating the monitored activity in response to determining that the side channel attack is underway.

26. The non-transitory computer readable storage medium of claim 23, wherein the stored processor-executable software instructions are configured to cause a processor to perform operations such that monitoring the activity of the computing device comprises:
determining a feature that is to be observed in the computing device in order to identify the side channel attack; and
collecting the behavior information from a hardware component associated with the determined feature.

27. The non-transitory computer readable storage medium of claim 26, wherein the stored processor-executable software instructions are configured to cause a processor to perform operations such that collecting the behavior information from the hardware component associated with the feature comprises collecting information from a log of API calls that stores API call information for use of the hardware component by software applications of the computing device.

28. The non-transitory computer readable storage medium of claim 23, wherein the stored processor-executable software instructions are configured to cause a processor to perform operations such that culling the received full classifier model to generate a lean classifier model further comprises:
applying machine learning techniques to generate a first family of classifier models that describe a cloud corpus of behavior vectors;
determining which factors in the first family of classifier models have a high probability of enabling the computing device to conclusively determine whether a behavior is indicative of a side channel attack;
generating a second family of classifier models that identify fewer factors and data points as being relevant for enabling the computing device to determine whether the behavior is indicative of a side channel attack; and
generating the lean classifier model based on the second family of classifier models.

* * * * *